(12) United States Patent
Aratani et al.

(10) Patent No.: US 6,278,554 B1
(45) Date of Patent: Aug. 21, 2001

(54) IMAGE PICKUP OPTICAL SYSTEM

(75) Inventors: Michiharu Aratani, Kawasaki; Hiroshi Nakanishi, Tokyo, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/427,742

(22) Filed: Oct. 27, 1999

(30) Foreign Application Priority Data

Oct. 30, 1998 (JP) .................................................. 10-324461

(51) Int. Cl.$^7$ ........................... G02B 27/14; G02B 17/00
(52) U.S. Cl. ........................ 359/631; 359/633; 359/726; 359/727
(58) Field of Search .................. 359/630–633, 359/726–729

(56) References Cited

U.S. PATENT DOCUMENTS

| | | | |
|---|---|---|---|
| 3,674,334 | 7/1972 | Offner | 350/55 |
| 4,775,217 | 10/1988 | Ellis | 350/538 |
| 5,063,586 | 11/1991 | Jewell et al. | 378/34 |
| 5,093,567 | 3/1992 | Staveley | 250/221 |
| 5,329,406 | 7/1994 | Nakanishi et al. | 359/811 |
| 5,549,855 | 8/1996 | Nakanishi et al. | 265/2.5 |
| 5,581,400 | 12/1996 | Takase et al. | 359/431 |
| 5,689,736 | 11/1997 | Okuyama et al. | 396/51 |
| 5,696,621 | 12/1997 | Nakanishi et al. | 354/298 |
| 5,706,136 | 1/1998 | Okuyama et al. | 359/630 |
| 5,815,741 | 9/1998 | Okuyama et al. | 396/51 |
| 5,825,560 | 10/1998 | Ogura et al. | 359/822 |
| 5,940,181 | 8/1999 | Tsubono et al. | 356/359 |
| 6,122,009 * | 9/2000 | Ueda | 348/335 |

FOREIGN PATENT DOCUMENTS

| | | |
|---|---|---|
| 3-181908 | 8/1991 | (JP) . |
| 7-128707 | 5/1995 | (JP) . |
| 7-333551 | 12/1995 | (JP) . |
| 8-179223 | 7/1996 | (JP) . |
| 8-234136 | 9/1996 | (JP) . |
| 8-234137 | 9/1996 | (JP) . |
| 8-292371 | 11/1996 | (JP) . |
| 8-292372 | 11/1996 | (JP) . |
| 9-5650 | 1/1997 | (JP) . |
| 10-260357 | 9/1998 | (JP) . |

* cited by examiner

Primary Examiner—Georgia Epps
Assistant Examiner—Michael A Lucas
(74) Attorney, Agent, or Firm—Fitzpatrick, Cella, Harper & Scinto

(57) ABSTRACT

An image pickup optical system has an optical element of a transparent, optical material including an entrance surface, at least one reflective surface, and an exit surface. The optical element has an optical power, the image pickup optical system has an image pickup element including a plurality of pixels. On the image pickup element an image is formed by light from an object through the optical element. The optical material is a material having an index change amount $\Delta n$ from an absolute dry condition at the temperature of 50° C. to saturation under a circumstance of the temperature being 50° C. and the humidity being 90%, the index change amount $\Delta n$ satisfying the following condition: $\Delta n \leq F \delta r_0^2/(2f^2 L)$ where F is the F-number of the image pickup optical system, f is the focal length of the image pickup optical system, $\delta$ is the pitch of the pixels of the image pickup element, L is the optical path length of the optical element along the reference axis, and $r_0$ is half of the length of the optical element along a direction perpendicular to a plane including the reference axis.

10 Claims, 3 Drawing Sheets

IMAGE PICKUP OPTICAL SYSTEM

BACKGROUND OF THE INVENTION

1. Field of the Invention

The present invention relates to an image pickup optical system and, more particularly, to the image pickup optical system for silver-salt cameras and electronic image pickup cameras.

2. Related Background Art

Materials forming the optical system are affected by a change in the surrounding circumstances. When optical materials, particularly organic materials, are used for the optical system, it is generally known that they absorb water vapor in the atmosphere or discharge water out of the optical system, so as to change the refractive index and dimensions of lens, thereby varying the characteristics of the optical system.

A known example of countermeasures against it is, as disclosed in Japanese Patent Application Laid-Open No. 3-181908, a method capable of maintaining constant optical characteristics without being affected by a change of humidity in the atmosphere, by employing such structure that each element made of the organic material is placed in a frame and that the outermost frame in contact with the atmosphere is made of an inorganic material (which should be an optical glass from the description of the optical characteristics in the embodiment, though the specification of the application describes only that it is a non-hygroscopic material) and is covered by a lid so as to maintain the inside humidity at that upon assembly.

Further, Japanese Patent Application Laid-Open No. 7-128707 (corresponding to U.S. Pat. No. 5,581,400) discloses a method of using a low-hygroscopic material as a material for forming the optical system.

However, the method described in Japanese Patent Application Laid-Open No. 3-181908 necessitates the optical component used as a lid, which increases the number of components.

Japanese Patent Application Laid-Open No. 7-128707 describes only the finder optical system, but describes nothing about the image pickup optical system in particular.

It was described previously that absorption of moisture caused the change in the refractive index and dimensions of the optical material. Describing in further detail, the ordinary optical materials increase the refractive index and dimensions with moisture absorption. Since the water in the air is absorbed from the surface of the medium to diffuse into the inside of the medium, the moisture-absorbing phenomenon induces an index difference between the medium surface and the inside even in the medium having the uniform internal index. After that, the moisture absorption reaches a state of equilibrium, so that the index becomes uniform again. As for the dimensional change due to the moisture absorption, the dimensional change appears only in the surface of the medium in the initial stage of the moisture absorption, and thus, stress appears inside the medium to change the surface shape. When the moisture absorption reaches equilibrium, the entire medium expands uniformly and the deformation of the surface shape is settled, too. For these reasons, even an optical component originally having no refractive power will come to have a refractive power with the absorption of moisture and again turn into a non-optical power material as the moisture absorption approaches the equilibrium.

The following points can be listed as influencing the index distribution performance of optical components.

1. An index gradient in the direction of the optical axis changes only the optical path length but rarely affects the power.
2. An index gradient in a direction normal to the optical axis greatly affects the power and gives rise to strong spherical aberration, particularly, in the initial stage of moisture absorption.
3. An index gradient in a direction inclined with respect to the optical axis brings about a state between above 1 and 2 and the influence on the power thereof varies depending upon the direction.
4. If there is a difference between index gradients in mutually orthogonal directions normal to the optical axis, powers differ depending upon azimuths and an astigmatic difference also appears on the optical axis.
5. The influence becomes greater on the power as the optical path becomes longer in the medium.
6. In the case of an optical element having a smaller size, the time to the equilibrium is shorter, but the index gradient becomes steeper in the moisture-absorbing process; therefore, a temporal change amount of power becomes greater.

Incidentally, in the finder optical system of ordinary compact cameras, it is common practice to use an eyepiece having the focal length of about 18 mm. Supposing a permissible amount of power change due to the moisture absorption is one diopter, a permissible change of the focal length due to the moisture absorption is about 0.3 mm. On the other hand, for example, in image pickup optical systems using solid state image sensing devices, as typified by digital cameras, the image pickup devices have been decreasing their size but increasing the number of pixels in recent years and with such progress demands are increasing for further downsizing and higher accuracy of the image pickup optical systems. For example, in the case of the image pickup optical system having the diagonal pickup device size of a quarter inch, using an image pickup device of about 800,000 pixels (at the pixel pitch of about 5 $\mu$m), and having the F-number of about 2, the depth of focus is approximately 10 $\mu$m. It is then necessary to suppress the variation of the focal length due to the moisture absorption to below 10 $\mu$m. Since the influence of moisture absorption on the power becomes more significant with a decrease in the size of optical element as described previously, the moisture absorption poses a significant problem in the image pickup systems decreasing their size.

On the other hand, it has been clarified that an optical system with sufficient correction for aberration can be constructed by introducing the concept of a reference axis and forming a component surface of an asymmetric, aspherical surface even in a non-coaxial, optical system; for example, Japanese Patent Application Laid-Open No. 9-5650 describes its designing method and Japanese Patent Applications Laid-Open No. 8-292371 and No. 8-292372 (both corresponding to U.S. Pat. No. 5,825,560) describe its design examples.

The moisture-absorbing phenomenon is a diffusion phenomenon of water particles into the inside of a medium and the index distribution inside varies depending upon the distance from the surface of the medium. It is thus expected in the case of a lens of a simple shape, for example, a lens of an almost spherical shape that equals index surfaces of refractive indices inside the lens also have the shape close to a sphere. In the optical system, for example, as described in Japanese Patent Application Laid-Open No. 8-292371, however, because it has a complicated structure in which a plurality of optical surfaces are formed integrally, the inside index distribution thereof is also complex. In the optical system described in this Japanese application the optical path is bent several times via reflective surfaces inside the optical element. Since the light passes twice in the index distribution before and after each reflection inside the medium, the influence of the index distribution on the optical performance is greater than in the case of only refractive surfaces being used. In the non-coaxial optical system, which is an optical system in which even a reference axis ray is obliquely incident to the optical surfaces as in the optical system described in the above Japanese application, the influence of index distribution is greater on the optical performance, because the light passes through different optical paths having different index profiles upon incidence to and upon emergence from the reflective surfaces. When the reflective surfaces have curvature as in the optical system described in the same Japanese application, the influence of moisture absorption on the optical performance becomes greater than in the cases using flat reflective surfaces, because the equal index surfaces inside the medium also have curvature. When the asymmetric, aspherical surfaces are used for the optical surfaces as in the optical system described in the same Japanese application, the inside index distribution is also asymmetric and thus asymmetric aberration occurs due to the moisture absorption.

In the optical system described in the embodiment of Japanese Patent Application Laid-Open No. 7-128707, all the reflective surfaces used are flat reflective surfaces and nothing is described as to the countermeasures against the issues in the use of the reflective surfaces having the curvature as described above.

SUMMARY OF THE INVENTION

An object of the present invention is to provide an image pickup optical system having stable optical characteristics against a change in humidity.

In order to accomplish the above object, an image pickup optical system according to one aspect of the present invention is characterized by comprising:

an optical element of a transparent, optical material comprising an entrance surface, at least one reflective surface, and an exit surface, the optical element having an optical power; and an image pickup element comprising a plurality of pixels, wherein on the image pickup element an image is formed by light from an object through the optical element, wherein the optical material is a material having an index change amount $\Delta n$ from an absolute dry condition at the temperature of 50° C. to saturation under a circumstance of the temperature 50° C. and the humidity 90%, the index change amount $\Delta n$ satisfying the following condition:

$$\Delta n \leq F \delta r_0^2 / (2f^2 L)$$

where F is an F-number of the image pickup optical system, f is the focal length of the image pickup optical system, $\delta$ is the pitch of the pixels of the image pickup element, L is the optical path length of the optical element along the reference axis, and $r_0$ is half of the length of the optical element along a direction perpendicular to a plane including the reference axis.

Another image pickup optical system according to another aspect of the present invention is characterized by comprising:

an optical element of a transparent, optical material comprising an entrance surface, at least one reflective surface, and an exit surface, the optical element having an optical power; and an image pickup element comprising a plurality of pixels, wherein on the image pickup element an image is formed by light from an object through the optical element, wherein the optical material is a material having an index change amount $\Delta n$ from an absolute dry condition at the temperature of 50° C. to saturation under a circumstance of the temperature 50° C. and the humidity 90%, the index change amount $\Delta n$ satisfying the following condition:

$$\Delta n \leq F \delta d^2 / (2f^2 L)$$

where F is an F-number of the image pickup optical system, f is the focal length of the image pickup optical system, $\delta$ is the pitch of the pixels of the image pickup element, L is the optical path length of the optical element along the reference axis, and d is the length the an image pickup surface of the image pickup element along a direction perpendicular to a plane including the reference axis.

DETAILED DESCRIPTION OF THE PREFERRED EMBODIMENTS

Embodiments of the present invention will be described below, and the way of expressing constitutional specifications of the embodiments will be conformable to that in the description of Japanese Patent Application Laid-Open No. 8-292371 (corresponding to U.S. Pat. No. 5,825,560).

Figure 1:
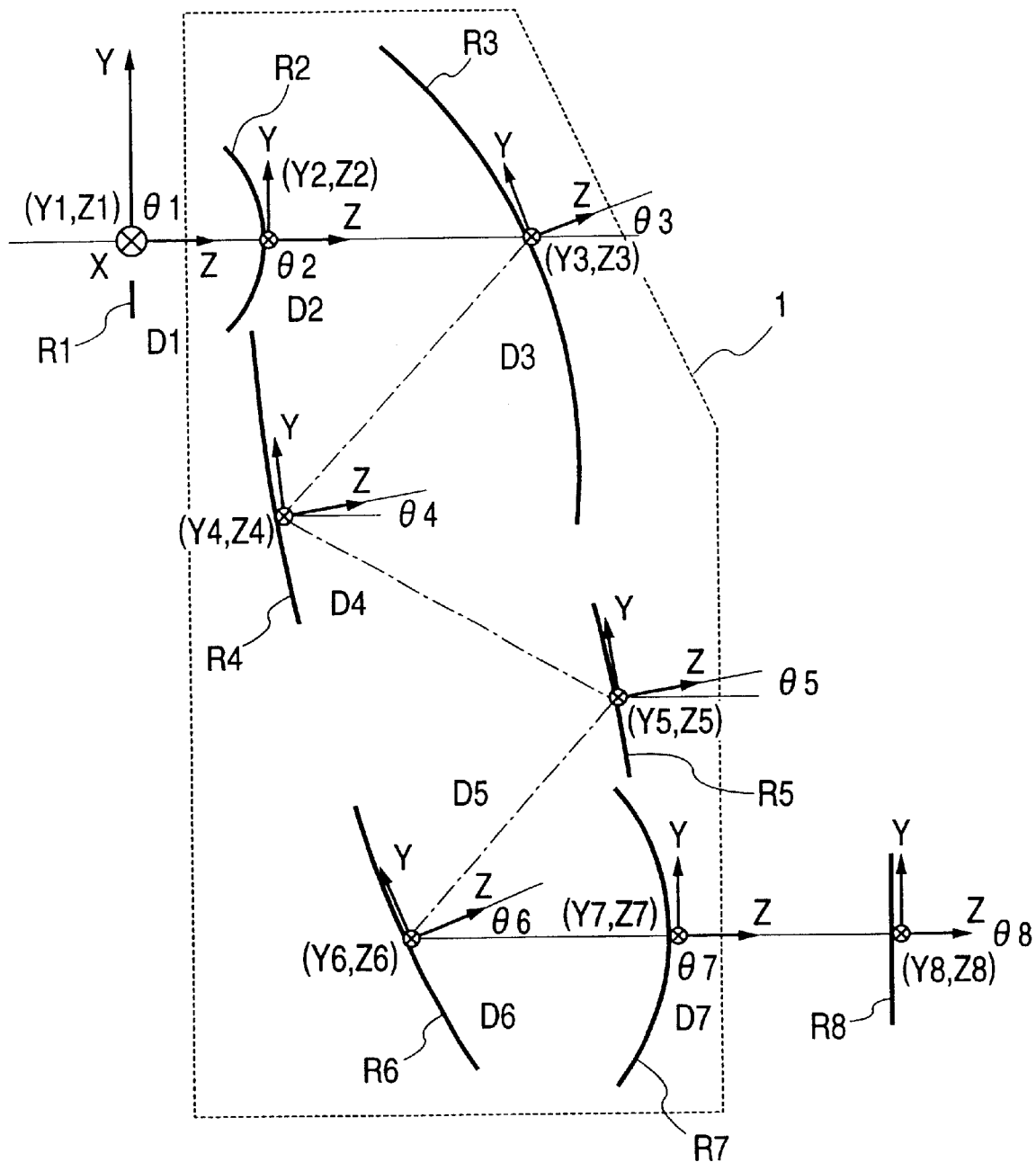
FIG. 1 is a diagram to explain a coordinate system in an embodiment of the present invention.

FIG. 1 is an explanatory diagram to explain a coordinate system for defining constitutional data of an optical system according to an embodiment of the present invention. In the present embodiment, the ith surface is defined as a surface of number i along a ray traveling from the object to the image plane (the ray is indicated by a chain line in FIG. 1 and will be called a reference axis ray).

In FIG. 1 the first surface R1 is a stop, the second surface R2 is a refractive surface coaxial with the first surface R1, the third surface R3 is a reflective surface tilted with respect to the second surface R2, the fourth surface R4, the fifth surface R5, and the sixth surface R6 are reflective surfaces shifted and tilted with respect to a preceding surface of each surface, and the seventh surface R7 is a refractive surface shifted and tilted with respect to the sixth surface R6. Each of the second surface R2 to the seventh surface R7 is formed on one optical element made of the medium of a low-hygroscopic material as described hereinafter, which is an optical element 1 in FIG. 1.

In the structure of FIG. 1, therefore, the medium from the unrepresented object surface to the second surface R2 is air, the medium from the second surface R2 to the seventh surface R7 is the common medium, and the medium from the seventh surface R7 to the eighth surface R8 of the image plane is air.

Since the optical system of the present embodiment is a decentered optical system, the surfaces constituting the optical system do not have a common optical axis. In the present embodiment, an absolute coordinate system is thus first set with the origin at the center of the effective diameter of the first surface and a reference axis of the optical system is defined as a path of a ray (reference axis ray) passing the origin and the center of the final image plane. Further, the reference axis in the present embodiment has a directivity (orientation). The direction of the reference axis is positive along a direction in which the reference axis ray travels in imaging.

In the present embodiment, the reference axis as a reference of the optical system was set as described above, but an axis as a reference of an optical system may be determined by employing any convenient axis in optical designing, handling of aberration, or expressing the shape of each surface forming the optical system. Generally speaking, however, the reference axis as a reference of an optical system is set along a path of a ray passing the center of the image plane and either the center of the stop, the entrance pupil, or the first surface of the optical system, or the center of the exit pupil or the final surface of the optical system.

Specifically, in the present embodiment the reference axis is set along the path of the ray (reference axis ray) passing the center point of the effective diameter of the first surface, i.e., the stop surface and reaching the center of the final image plane while being refracted and reflected by the refractive surfaces and reflective surfaces. A number of each surface is set in the order of refractions and reflections of the reference axis ray.

The reference axis runs with changing its direction according to the law of refraction or reflection along the order of the surfaces thus set and finally reaches the center of the image plane accordingly.

All the tilt surfaces R3 to R6 forming the optical system of the present embodiment are basically tilted within the same plane (or within the plane of FIG. 1). the axes of the absolute coordinate system are defined as follows.

Z-axis: the reference axis passing the origin and raveling toward the second surface R2.

Y-axis: a straight line passing the origin and making a 90° angle counterclockwise with the Z-axis within the tilt plane (or in the plane of FIG. 1)

X-axis: a straight line passing the origin and being normal to each of the Z- and Y-axes (which is a straight line normal to the plane of FIG. 1).

For expressing the surface shape of the ith surface Ri forming the optical system, recognition of shape becomes easier by setting a local coordinate system (x, y, z) with the origin at an intersecting point between the reference axis and the ith surface and expressing the surface shape thereof by in the local coordinate system, rather than by expressing the surface shape in the absolute coordinate system. Therefore, the surface shape of the ith surface will be expressed by the local coordinate system in the expression of the constitutional data of the present embodiment.

A tilt angle of the ith surface within the YZ plane is expressed by an angle $\theta i$ (°) with the counterclockwise direction being positive with respect to the Z-axis of the absolute coordinate system. In the present embodiment, the origin of the local coordinate system of each surface is thus on the YZ plane in FIG. 1. It is also noted that there is no decentering of the surface within the XZ and XY planes. Further, each of the y- and z-axes of the local coordinate system (x, y, z) of the ith surface is inclined at an angle ei within the YZ plane with respect to the absolute coordinate system (X, Y, Z), and, specifically, the axes of the local coordinate system are set as follows.

z-axis: a straight line passing the origin of the local coordinate system and making the angle ei counterclockwise within the YZ plane with respect to the Z-direction of the absolute coordinate system.

y-axis: a straight line passing the origin of the local coordinate system and making a 90° angle counterclockwise within the YZ plane with respect to the z-direction.

x-axis: a straight line passing the origin of the local coordinate system and being normal to the YZ plane.

Di is a scalar value indicating the distance between the origins of the local coordinate systems of the ith surface and the (i+1)th surface, and ndi and vdi are the refractive index and Abbe number of the medium between the ith surface and the (i+1)th surface.

Each of the optically acting surfaces constituting the optical system of the present embodiment is comprised of a spherical surface or a rotationally asymmetric, aspherical surface. For spherical parts among them the radius $r_i$ of curvature thereof will be given to represent the spherical shape. The sign of the curvature radius $r_i$ is negative when the center of curvature is on the first surface side with respect to the reference axis (the chain line in FIG. 1) running from the first surface R1 to the image plane R8, while it is positive when the curvature center is on the image plane side.

The spherical surfaces have the shape expressed by the following equation:

$$z=\{(x^2+y^2)/r_i)\}/[1+\{1-(x^2+y^2)/r_i^2\}^{1/2}]$$

The optical system of the present invention has at least one rotationally asymmetric, aspherical surface and the shape thereof is expressed by the following equation:

$$Z=A/B+C_{02}y^2+C_{20}x^2+C_{03}y^3+C_{21}x^2y+C_{04}y^4+C_{22}x^2y^2+C_{40}x^4,$$

where $A=(b+a)(y^2 \cos^2 t+x^2)$ $B=2abcost(1+(b-a)ysint/(2ab)+[1+(b-a)ysint/(ab)-y^2/(ab)-\{4abcos^2t+(b+a)^2 \sin^2 t\}x^2/(4a^2b^2 \cos^2 t)]^{1/2})$.

Since the above equation for curved surfaces includes only terms of even orders as to x, the curved surfaces defined by the above equation have the shape of a plane symmetrical with respect to the symmetry plane of the yz plane. If the curved surfaces further satisfy the following conditions, they are also symmetric with respect to the xz plane.

$C_{03}=C_{21}=0$ and $t=0$

If the curved surfaces further satisfy the following conditions, they are rotationally symmetric.

$C_{02}=C_{20}$ and $C_{04}=C_{40}=C_{22}/2$

When these conditions are not met, the shape is rotationally asymmetric.

In the present embodiment, all the surfaces satisfy the condition of $C_{02}=C_{20}=0$ and are constructed by adding a higher-order, asymmetric, aspherical surface to the basic shape of quadratic surface.

In the present embodiment, the first surface is the stop, as illustrated in FIG. 1. A horizontal half field angle is a maximum field angle of the beam incident on the stop R1 in the YZ plane of FIG. 1, while a vertical half field angle is a maximum field angle of the beam incident on the stop R1 in the XZ plane. The diameter of the stop R1 being the first surface is indicated as a stop diameter. This relates to brightness of the optical system. Since the entrance pupil is located on the first surface, the stop diameter is equal to the diameter of the entrance pupil.

The effective image range on the image plane is represented by an image size. The image size is expressed by a rectangular region having a horizontal size along the y-direction of the local coordinate system and a vertical size along the x-direction of the local coordinate system.

In the present embodiment, the size of the optical system is indicated. The size is one defined by the effective diameter of a ray.

In the present embodiment, the pixel pitch of the image pickup element is given. The pixel pitch is the intervals of the pixels forming the image pickup element.

The present embodiment will be explained below in more detail.

Figure 2:
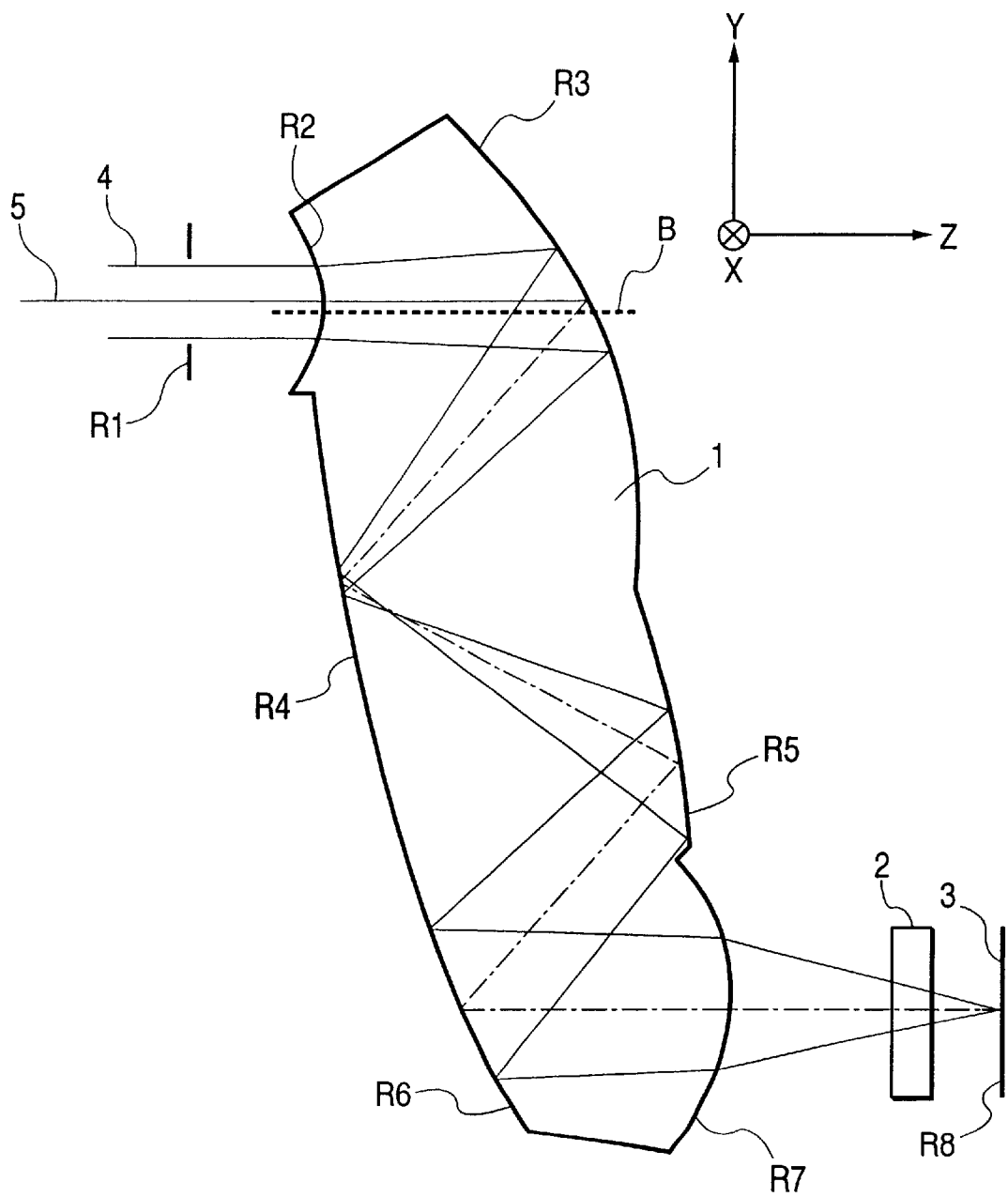
FIG. 2 is a diagram to explain the structure of the image pickup optical system in the above embodiment.

FIG. 2 is a cross-sectional view of the optical system of the present embodiment in the YZ plane. The present embodiment is the photographing optical system having a horizontal field angle of 52.6° and a vertical field angle of 40.6°. In FIG. 2, the optical path 4 at the center field angle is illustrated. The constitutional data of the present embodiment is as follows, and in the table "e−0x" means "x10$^{-x}$."

Horizontal half field angle 26.3°

Vertical half field angle 20.30

Stop diameter 2.1 mm

Focal length 4.2 mm

F-number 2.0

Image size 4 mm horizontal×3 mm vertical

Pixel pitch 5 μm horizontal×5 μm vertical

The size of the optical system (X×Y×Z)=10. 4 mm×27.4 mm×21.2 mm

TABLE 1

| i | Yi | Zi | θi (°) | Di (mm) | Ndi | vdi | Ri | Shape of spherical surface $r_i$ (mm) |
|---|------|-------|-------|-------|---------|-------|----------------------|--------|
| 1 | 0.00 | 0.00 | 0.00 | 3.40 | 1 | | stop | ∞ |
| 2 | 0.00 | 3.40 | 0.00 | 7.00 | 1.53041 | 55.50 | refractive surface | −4.887 |
| 3 | 0.00 | 10.40 | 25.00 | 10.00 | 1.53041 | 55.50 | reflective surface | |
| 4 | −7.66 | 3.97 | 10.00 | 10.00 | 1.53041 | 55.50 | reflective surface | |
| 5 | −12.66 | 12.63 | 10.00 | 8.50 | 1.53041 | 55.50 | reflective surface | |
| 6 | −19.17 | 7.17 | 25.00 | 7.00 | 1.53041 | 55.50 | reflective surface | |
| 7 | −19.17 | 14.17 | 0.00 | 7.07 | 1 | | refractive surface | −6.524 |
| 8 | −19.17 | 21.24 | 0.00 | 0.00 | 1 | | image plane | ∞ |

TABLE 2

(Shapes of aspherical surfaces)

| | R3 surface | R4 surface | R5 surface | R6 surface |
|---|---|---|---|---|
| a | −1.61839e+01 | −2.50732e+00 | −9.53779e+01 | 5.05342e+00 |
| b | −1.25665e+01 | 2.52739e+00 | −3.53371e+01 | −8.31188e+00 |

TABLE 2-continued (Shapes of aspherical surfaces)

| | R3 surface | R4 surface | R5 surface | R6 surface |
|---|---|---|---|---|
| t | 2.59881e+01 | −8.04837e+01 | 4.35207e+01 | −2.24737e+01 |
| $c_{02}$ | 0. | 0. | 0. | 0. |
| $c_{20}$ | 0. | 0. | 0. | 0. |
| $c_{03}$ | −1.38328e−04 | 1.15553e−03 | 3.53074e−04 | −5.59866e−04 |
| $c_{21}$ | 4.61307e−04 | 4.86323e−03 | −1.26967e−03 | −1.17474e−03 |
| $c_{04}$ | 9.02763e−06 | −1.25972e−04 | −2.02832e−05 | −1.39401e−04 |
| $c_{22}$ | 7.64906e−05 | −2.57791e−04 | −3.46921e−04 | −2.09750e−04 |
| $c_{40}$ | 1.02169e−05 | −6.89833e−04 | −8.12941e−05 | −1.35370e−04 |

The image pickup optical system having the optically acting surfaces (refractive surfaces and reflective surfaces) represented by the above constitutional data is illustrated in FIG. 2.

In FIG. 2, reference numeral 1 designates the optical element, which is comprised of a transparent body of a low-hygroscopic material. Formed in the surfaces of the optical element 1 in the order of the passage of the rays from the object are the concave, refractive surface (entrance surface) R2 having a negative refracting power, the four reflective surfaces of the concave mirror R3, the reflective surface R4, the reflective surface R5, and the concave mirror R6, and the convex, refractive surface (exit surface) R7 having a positive refracting power. R1 denotes the stop (entrance pupil) located on the object side of the optical element 1, 2 denotes an optical filter, such as a low-pass filter or the like, and R8 denotes the final image plane on which the image pickup surface of the image pickup element 3 (image pickup medium), such as CCD or the like, is located. Numeral 5 represents the reference axis of the image pickup optical system.

The two refractive surfaces R2, R7 both are rotationally symmetric, spherical surfaces and all the reflective surfaces are anamorphic surfaces symmetric only with respect to the YZ plane and rotationally asymmetric, aspherical surfaces.

Next described is the imaging action in the present embodiment. The light 4 from the object is regulated so that the amount of incident-light is regulated by the stop Ri and thereafter the light is incident on the entrance surface R2 of the optical element 1. The light is then reflected by the surfaces R3 and R4 and thereafter forms an intermediate image once near the surface R4. Then, the light is reflected successively by the surfaces R5 and R6 to emerge from the exit surface R7. Thereafter, the light travels through the low-pass filter 2 to again form an image on the final image plane R8.

In the present embodiment the direction of the reference axis incident an the optical element 1 is parallel to and in the same as the direction of the reference axis emerging from the optical element 1. The reference axis, including the incident axis and the emergent axis, is on the plane of the drawing (on the YZ plane).

In this way, the optical element 1 functions as an optical unit having a positive refracting power as a whole and having the desired optical performance, based on the refractive powers of the entrance and exit surfaces and the refracting powers by the curved reflectors therein.

Since, in the present embodiment, the reference axis is present in the YZ plane, the size of the element in the Y-direction is longer than that in the X-direction. The thicker the medium, the gentler the index gradient caused by moisture absorption, as described previously. Therefore, the power variation due to the moisture absorption is greater in the azimuth of the X-direction than in the azimuth of the Y-direction.

The transition of the index change due to the moisture absorption will be described referring to FIGS. 3A to 3C.

Figure 3A:
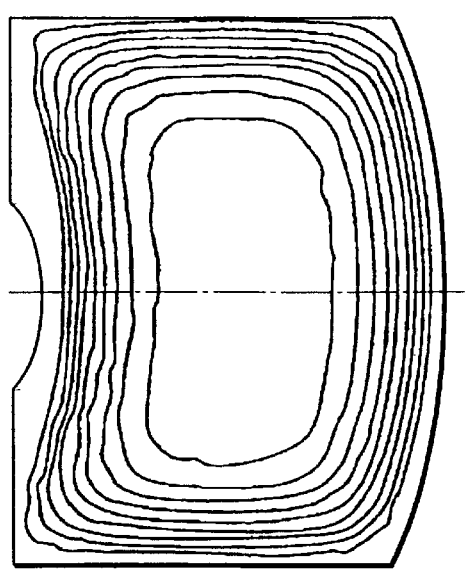
FIGS. 3A, 3B and 3C are drawings to explain the index change due to the moisture absorption in a retain cross section of the optical element of the above embodiment.
Figure 3A:
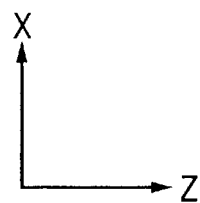
Figure 3B:
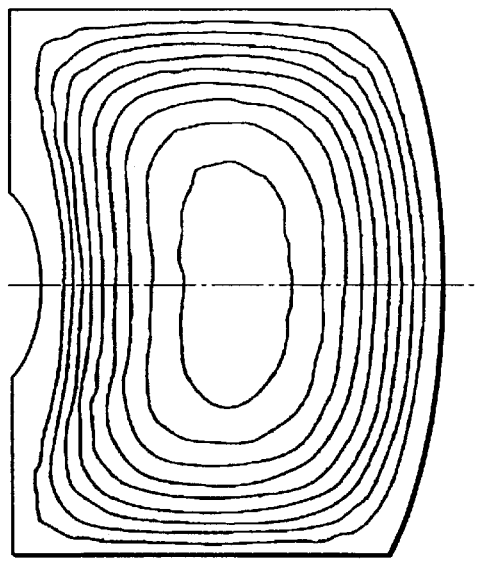
Figure 3C:
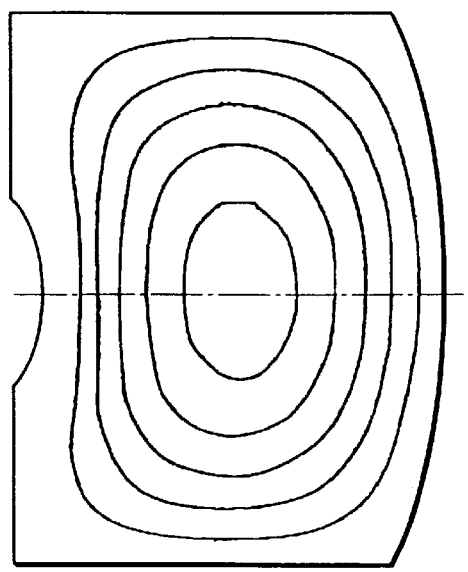

FIGS. 3A to 3C show index distributions in the XZ cross section of the optical element 1 at the position of FIG. 2. In the figures, thin lines represent equal index lines. Further, the chain line indicates the reference axis. FIG. 3A shows the index distribution in the initial stage of moisture absorption in which the gradient is steep near the surface of the optical element 1, while the index gradient is low near the reference axis. After that, with diffusion of water, the index distribution moves into the inside of the optical element 1 as shown in FIG. 3B. As the moisture absorption goes further to near the saturation level, the gradient of the index distribution becomes gentler inside the optical element 1 as illustrated in FIG. 3C. In the figures, since the index profiles along the Z-direction are profiles along the reference axis direction, the effect of the index profile in the Z-direction is weaker on the power variation of the optical system than the effect of the index profile in the X-direction. Thus, attention is focused on the index profile in the X-direction. In the index distribution of FIG. 3A, the index gradient near the optical axis is gentle, though there exists a steep index gradient near the surface; therefore, mainly off-axis rays are affected by the moisture absorption, so as to vary spherical aberration. In the state of FIG. 3C, since the moisture absorption is close to the saturation, the index gradient is also gentle. Therefore, the moisture absorption changes powers of the optical element 1 most in the case of the distribution of FIG. 3B. The X-directional index profile in the largest power change due to the moisture absorption can be approximated by the following equation.

$$n = n_0(1-(A/2)r^2) \qquad \text{Eq (1)}$$

In the above equation, $n_0$ is an index of refraction in a dry condition, r is the distance from the reference axis, and A is a constant given by $\Delta n = n_0 r_0^2 A/2$ (provided that $r_0$ is defined by $r_0 = D/2$, where D is the thickness of the optical element in the X-direction) where $\Delta n$ is the index change amount from the absolute dry condition (vacuum dehumidification) at 50° C. to hygroscopic saturation under the circumstance of the temperature being 50° C. and the humidity being 90%. The index change amount $\Delta n$ generally increases with a rise of the ambient temperature. In the present specification, the index change amount $\Delta n$ is defined as the change amount of index from the absolute dry condition to saturation at the ambient temperature of 50° C.

When L represents an optical path length along the reference axis in the optical element 1, the power 4 generated by the index distribution given by the above equation is as follows:

$$\phi = (2\theta_0/r_0) \sin(L\pi/p)\cos(L\pi/p) \qquad \text{Eq (2)}$$

Here $p = 2T/A^{1/2}$ and $\theta_0 = A^{1/2} n_0 r_0$.

In the present embodiment, focusing on an object in the near range is effected by moving the entire optical system to the image pickup surface R8 of the image pickup element. Particularly, in the present embodiment, because the direction of the reference axis incident on the optical element 1 is parallel to and identical to the direction of the reference axis emerging from the optical system 1, the focusing operation can be performed by moving the whole optical system parallel to the direction of the emerging reference axis (the Z-axis direction).

The moisture absorption changes the power of the optical system and, in turn, changes the focal length. The change of the focal length can be compensated for by carrying out the focusing operation, but the index change due to the moisture absorption does not bring about only a change of the focal length, but also brings about a change of the optical performance (aberration), because the index distribution due to the moisture absorption is very complex inside the optical element, as described previously. It is, thus, desirable to control the change of focal length due to the moisture absorption below a certain level.

Since the power change of the optical system is great in the azimuth of the X-direction as described previously, an astigmatic difference also occurs on the optical axis with the power change of the optical element 1 due to the moisture absorption.

When f stands for the focal length of the optical element 1 before the moisture absorption, a variation $\Delta f$ of the focal length in the azimuth of the X-direction due to the moisture absorption is approximately equal to $(2f^2 L/r_0^2)\Delta n$ from Eq. (2). In order to prevent the degradation of the optical performance due to the moisture absorption, it is desirable to meet the condition of $\Delta f \leq F\delta$, where F is the F-number of the optical system and $\delta$ is the pixel pitch of the image pickup element. Therefore, the index change amount $\Delta n$ caused by the moisture absorption desirably satisfies the following condition:

$$\Delta n \leq F\delta r_0^2/(2f^2 L) \qquad \text{Eq (3)}.$$

In the present embodiment, the focal length f of the optical element is f=4.2 mm, the pixel pitch $\delta$ of the image pickup element is $\delta$=5 μm, the optical path length L inside the optical element is L=42.5 mm, and the X-directional thickness of the optical element is $D=2r_0=10.4$ mm. It is thus desirable that the index change amount $\Delta n$, due to the moisture absorption, satisfy the condition of $\Delta n \leq 5\ 0.00016$ from Eq. (3).

A moisture absorption coefficient Q of optical material is expressed by the following equation where the weight in the dry condition is $W_0$ and the weight in a wet state is W.

$$(W-W_0)/W_0 \times 100\ (\%)$$

Here, particularly, a saturation moisture absorption coefficient is defined as a moisture absorption coefficient at the saturation under the circumstance of the temperature being 50° C. and the humidity being 90%.

The following table lists the moisture absorption coefficients and index change amounts due to the moisture absorption of organic optical materials used commonly, for example, acrylic resin, polycarbonate resin, and olefin base or norbornene base resin.

TABLE 3

| | Trade name | Absorption coefficient | Index change due to absorption |
|---|---|---|---|
| acrylic resin | Acrypet, Mitsubishi Rayon | 2.0% | 15 × 10<sup>−4</sup> |
| polycarbonate resin | Panlite, Teijin Kasei | 0.35% | 3 × 10<sup>−4</sup> |
| olefin base or norbornene base resin | Zeonex Nippon Zeon | 0.003% | 0.25 × 10<sup>−4</sup> |

Since the index change amount per % of the moisture absorption coefficient of each material is approximately $8 \times 10^{-4}$, the index change amount due to the moisture absorption can be controlled to a low level by using the material with the saturation moisture absorption coefficient Q satisfying the condition of $Q \leq 0.2\%$.

Since the moisture absorption does not change only the refractive index but also changes the dimensions of the medium, the surface shape and surface spacing also vary therewith, so as to change the optical performance. Therefore, the saturation absorption coefficient Q needs to be sufficiently small in order to prevent the change of the optical performance due to the moisture absorption and it is more desirable to satisfy the condition of $Q \leq 0.1\%$.

In the present embodiment the change of the optical performance due to the moisture absorption is prevented even with use of the organic material easy to mold, by making the optical element 1 of the olefin base material having a saturation absorption coefficient of about 0.03%.

In the case of the present embodiment wherein the entrance pupil is located near the first surface R2 of the optical element 1, particularly, the reflective surface R3, which is a curved surface first from the object, is provided with the converging action, which contributes to downsizing of the optical system. This is for making the optical system further thinner by intermediate imaging of pupil rays (principal rays) at the stage near the entrance surface. This arrangement can converge the rays before the off-axis principal rays outgoing from the stop R1 diverge greatly. It can thus, avoid an increase of the effective diameter of each surface after the first reflective surface R3 due to increase of the field angle of the optical system. Therefore, the X-directional thickness of the element can be as small as approximately double of the image size in the X-direction (the horizontal direction). When the image size (the length of the image pickup surface) in the X-direction is d, Eq. (3) can be written as follows.

$$\Delta n \leq F\delta d^2 / 2f^2 L \qquad \text{Eq (4)}$$

Therefore, the change of the optical performance due to the moisture absorption can be prevented by making the optical element 1 of a material satisfy Eq. (4).

The index gradient near the optical axis is gentler than the index gradient near the surface of the medium, as described previously. Therefore, when the reflective surface with curvature near the entrance surface of the optical system is provided with the converging action as in the present embodiment, the off-axial principal rays outgoing from the stop RI can be arranged to pass near the optical axis where the index gradient is lower, without a large spread, whereby the change of the optical performance due to the moisture absorption can be controlled to a lower level.

What is claimed is:

1. An image pickup optical system comprising:

an optical element of a transparent, optical material comprising an entrance surface, at least one reflective surface, and an exit surface, said optical element having an optical power; and an image pickup element comprising a plurality of pixels, wherein on the image pickup element an image is formed by light from an object through said optical element, wherein said optical material is a material having an index change amount $\Delta n$ from an absolute dry condition at the temperature of 50° C. to saturation under a circumstance of the temperature being 50° C. and the humidity being 90%, the index change amount $\Delta n$ satisfying the following condition:

$$\Delta n \leq F\delta r_0^2 / (2f^2 L)$$

where F is the F-number of said image pickup optical system, f is the focal length of said image pickup optical system, $\delta$ is the pitch of the pixels of said image pickup element, L is the optical path length of said optical element along the reference axis, and $r_0$ is half of the length of said optical element along a direction perpendicular to a plane including the reference axis.

2. The image pickup optical system according to claim 1, wherein the at least one reflective surface of said optical element is a curved surface.

3. The image pickup optical system according to claim 2, wherein the at least one reflective surface of said optical element is a rotationally asymmetric, aspherical surface.

4. The image pickup optical system according to claim 2, wherein the at least one reflective surface of said optical element is a surface symmetric with respect to only one plane.

5. The image pickup optical system according to claim 1, wherein said optical material has a saturation moisture absorption coefficient of not more than 0.2% under the circumstance of the temperature being 50° C. and the humidity being 90% from the absolute dry condition at the temperature 50° C.

6. An image pickup optical system comprising:

an optical element of a transparent, optical material comprising an entrance surface, at least one reflective surface, and an exit surface, said optical element having an optical power; and an image pickup element comprising a plurality of pixels, wherein on the image pickup element an image is formed by light from an object through said optical element, wherein said optical material is a material having an index change amount $\Delta n$ from an absolute dry condition at the temperature of 50° C. to saturation under a circumstance of the temperature being 50° C. and the humidity being 90%, the index change amount $\Delta n$ satisfying the following condition:

$$\Delta n \leq F\delta d^2 / (2f^2 L)$$

where F is the F-number of said image pickup optical system, f is the focal length of said image pickup optical system, $\delta$ is the pitch of the pixels of said image pickup element, L is the optical path length of said optical element along the reference axis, and d is the length of an image pickup surface of said image pickup element along a direction perpendicular to a plane including the reference axis.

7. The image pickup optical system according to claim 6, wherein the at least one reflective surface of said optical element is a curved surface.

8. The image pickup optical system according to claim 7, wherein the at least one reflective surface of said optical element is a surface symmetric with respect to only one plane.

9. The image pickup optical system according to claim 7, wherein the at least one reflective surface of said optical element is a rotationally asymmetric, aspherical surface.

10. The image pickup optical system according to claim 6, wherein said optical material has a saturation moisture absorption coefficient of not more than 0.2% under the circumstance of the temperature being 50° C. and the humidity being 90% from the absolute dry condition at the temperature 50° C.

* * * * *

UNITED STATES PATENT AND TRADEMARK OFFICE
CERTIFICATE OF CORRECTION

PATENT NO.    : 6,278,554 B1  Page 1 of 1
DATED         : August 21, 2001
INVENTOR(S)   : Michiharu Aratani et al.

It is certified that error appears in the above-identified patent and that said Letters Patent is hereby corrected as shown below:

Column 4,
Line 32, "retain" should read -- certain --.

Column 5,
Line 38, "the axes" should read -- The axes --.
Line 67, "ei" should read -- $\theta i$ --.

Column 6,
Line 5, "ei" should read -- $\theta i$ --.

Column 9,
Line 4, "position" should read -- position B --.
Line 48, "power 4" should read -- power $\phi$ --.
Line 54, "2T" should read -- $2\pi$ --.

Signed and Sealed this

Twenty-eighth Day of January, 2003

JAMES E. ROGAN
*Director of the United States Patent and Trademark Office*